J. ASCHER.
Baggage-Car for Street-Railways.

No. 222,853. Patented Dec. 23, 1879.

WITNESSES:

INVENTOR
Julius Ascher
By Paul Goepel
ATTORNEY

2 Sheets—Sheet 2.
J. ASCHER.
Baggage-Car for Street-Railways.
No. 222,853. Patented Dec. 23, 1879.
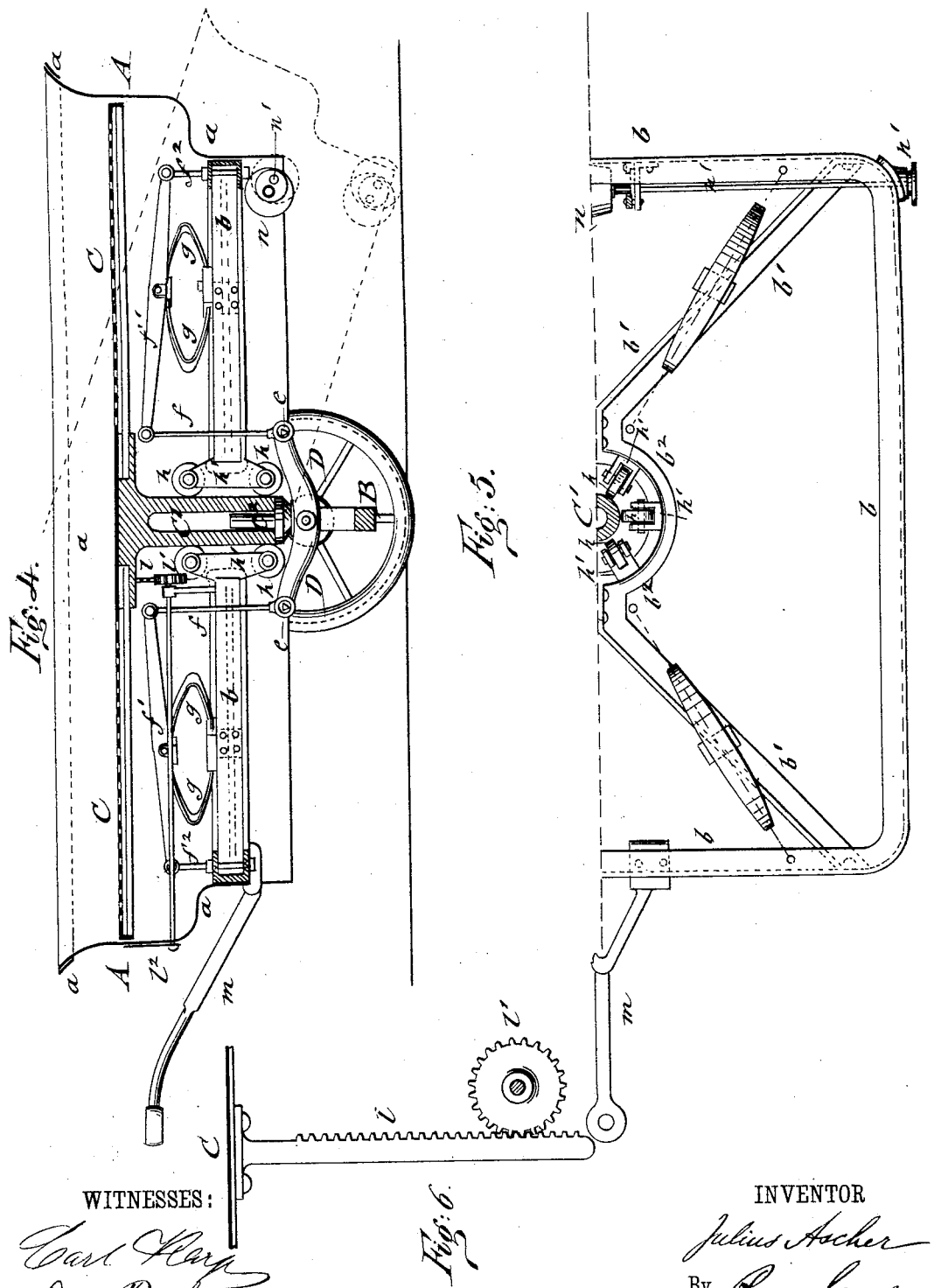
WITNESSES:
INVENTOR
Julius Ascher
By Paul Goepel
ATTORNEY ively, a vertical transverse and a vertical lon

UNITED STATES PATENT OFFICE.

JULIUS ASCHER, OF BERLIN, PRUSSIA, GERMANY.

IMPROVEMENT IN BAGGAGE-CARS FOR STREET-RAILWAYS.

Specification forming part of Letters Patent No. 222,853, dated December 23, 1879; application filed November 8, 1879.

*To all whom it may concern:*

Be it known that I, JULIUS ASCHER, of the city of Berlin, in the Kingdom of Prussia, German Empire, have invented a Baggage-Car for Street-Railway Cars, of which the following is a specification.

This invention relates to an improved baggage-car which is intended to be attached to street-cars, so as to receive the parcels, baskets, and other miscellaneous articles of baggage which at present cannot be carried by the passengers, and have to be sent by express or otherwise. The baggage-car is arranged with a weighing attachment, by which the exact weight of the articles to be carried can be ascertained and a small charge be collected therefor. The baggage-car serves thus in a great measure to facilitate the conveyance of packages and baggage of all kinds. It also increases the comfort of the passengers, as no package should then be admitted into the cars, and forms an additional source of revenue for the railroad companies and a great convenience to the public, as the packages and goods arrive at the same time with the passengers.

The invention consists, essentially, of a baggage wagon or car formed of a wheeled body, in the interior of which is arranged a perforated platform, that is vertically guided and supported on a system of levers and springs in such a manner that the increase of weight lowers the platform and indicates the weight of the articles placed thereon by an index or pointer on a dial attached to the car or wagon body.

Figure 1:
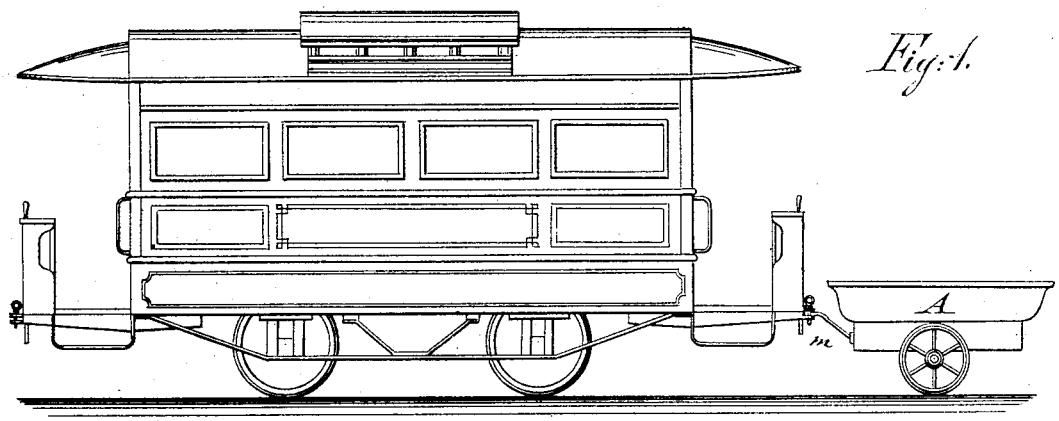
Figure 2:
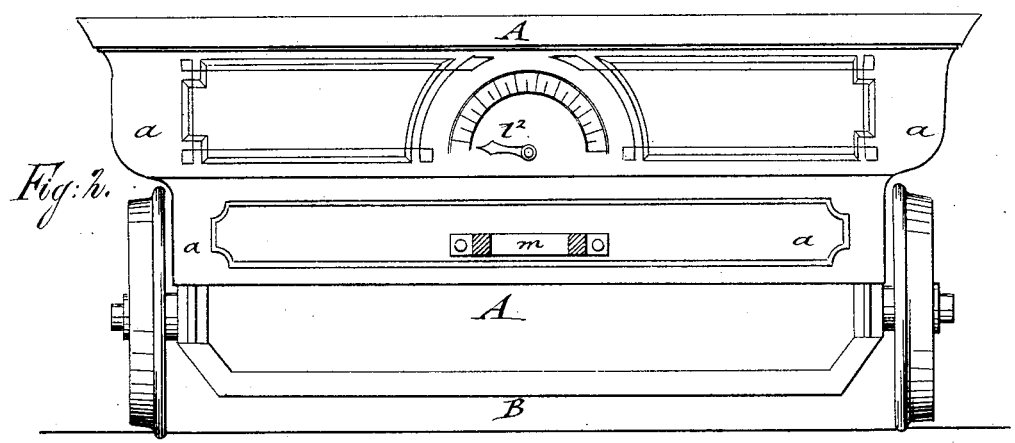
Figure 3:
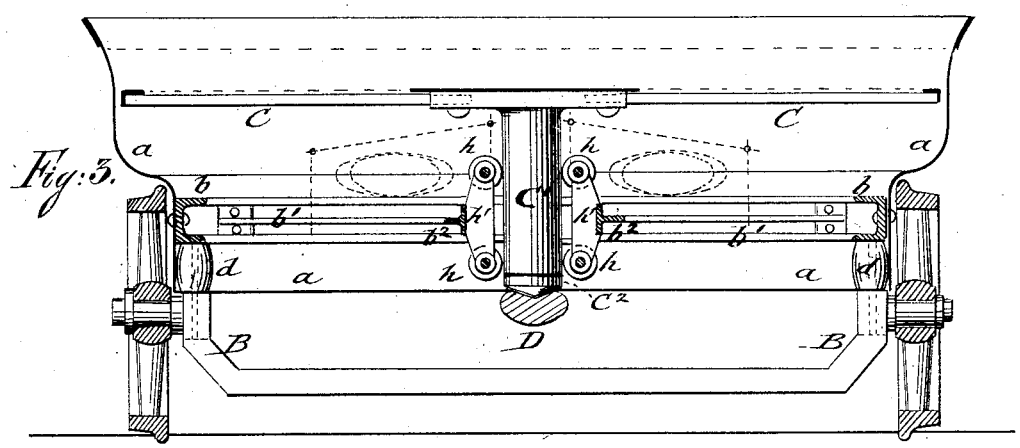

In the accompanying drawings, Figure 1 represents a side view of a street-car with baggage car or wagon attached thereto. Fig. 2 is a front view of the baggage-car, showing the scale arrangement. Figs. 3 and 4 are, respectively, a vertical transverse and a vertical longitudinal section of the car; Fig. 5, a plan view of one-half of the same with platform removed; and Fig. 6 is a detail side view of the rack and pinion for moving the index of the scale.

Similar letters of reference indicate corresponding parts.

A in the drawings represents the body of my improved baggage-car for street-railway cars, which body is made of an outer sheet-metal casing, $a$, and of a frame, $b$, that rests on rubber springs $d$ upon the axle B. That part of the axle between the pedestals of the springs $d$ is downwardly curved or crooked, so as to have an open space between the pedestals, as shown in Fig. 3. At the interior of the outer casing, $a$, and above the frame $b$, is supported a platform, C, on which the baggage is placed. This platform C is perforated to admit the passage of rain and dust, and supported by means of a downwardly-extending hollow center post, C', on a pin, $C^2$, of a longitudinal bearing, D. This bearing D is hung by transverse knife-edges $e$ to the lower ends of four vertical rods, $f$, which are pivoted to fulcrumed levers $f'$, whose opposite ends are pivoted to fixed shorter arms or rods $f^2$ of the base-frame $b$. The fulcra of the levers $f'$ are supported on cushioning-springs $g$, of elliptic, spiral, or other shape, which springs are secured at their lower parts to diagonal braces $b'$ of the base-frame $b$ of the body A.

The center post, C', is vertically guided by anti-friction rollers $h$, which are supported in vertical bearings $h'$ of a central brace-connecting ring, $b^2$. The brace-connecting ring $b^2$ is concentric to the post C' of the platform, the vertical bearings extending above and below the ring, and carrying guide-rollers $h$ at both ends, so that the platform is guided in an exact and reliable manner at whatever point the weight may be placed on the same. According to the greater or less weight the platform will be more or less lowered, the vertical motion of the same being transmitted, by a fixed rack-bar, $l$, and intermeshing pinion $l'$, to an index or pointer, $l^2$, at the outer end of the extended shaft of the pinion, the pointer indicating on an exterior dial the exact weight of the article placed on the platform. The conductor is thereby enabled to read off the weight and collect the freight to be charged thereon.

The baggage-car is connected by a fixed arm or tongue, $m$, with the coupling of the street-car, as shown in Fig. 1. The baggage-car may be supported on two or four wheels, as desired. In case it is placed on two wheels only there has to be a small supporting-wheel, $n$, at the rear end, which admits the propelling of the car like a hand-wagon, in the position shown in dotted lines in Fig. 4. This wheel $n$ is supported in eccentric bearings, and when not required for use thrown up so as to be covered by the lower part of the body A. When the baggage-car is uncoupled from the street-car the supporting-wheel is lowered by means of the eccentric bearings, which are turned by a hand-wheel and shaft, $n'$, so as to support the body for more convenient propulsion.

Having thus described my invention, I claim as new and desire to secure by Letters Patent—

1. In a baggage-car for street-railways, the combination of an exterior wheeled body with a guided and perforated interior platform, and with a weighing attachment connected thereto, substantially as and for the purpose described.

2. The combination, in a baggage-car for street-railway cars, of a platform, C, having downwardly-extending hollow post C', with a suspended and spring-cushioned bearing, D, vertically-guiding rollers $h$, and a suitable weight-indicating device, substantially as described.

3. A baggage-car for street-cars, provided with a perforated platform to admit the passage of water, substantially as specified.

4. A two-wheeled baggage-car for street-railway cars, provided with a fixed tongue, and with an eccentrically-supported rear wheel, and with mechanism by which the wheel can be lowered below the body of the car or drawn back within the same, substantially as set forth.

In testimony whereof I have signed my name to this specification in the presence of two subscribing witnesses.

JULIUS ASCHER.

Witnesses:
CARL FEHLERT,
BERTHOLD ROI.